United States Patent [19]
Abella

[11] 3,903,294
[45] Sept. 2, 1975

[54] PROCESS OF FORMING HEAT SHRINKABLE POLYETHYLENE TEREPHALATE FILM

[75] Inventor: Richard M. Abella, Taylors, S.C.

[73] Assignee: Celanese Corporation, New York, N.Y.

[22] Filed: Sept. 13, 1973

[21] Appl. No.: 397,041

[52] U.S. Cl. .................................................. 264/289
[51] Int. Cl.² .............................................. B29D 7/24
[58] Field of Search ........ 264/235, 210 R, 289, 346, 264/DIG. 73

[56] References Cited
UNITED STATES PATENTS

| | | | |
|---|---|---|---|
| 2,904,841 | 9/1959 | Haugh | 264/289 |
| 2,928,132 | 3/1960 | Richards, Jr. | 264/289 |
| 3,177,277 | 4/1965 | Adant et al. | 264/289 |
| 3,187,075 | 6/1965 | Seifried et al. | 264/210 R |
| 3,574,046 | 4/1971 | Buteux | 264/289 |

*Primary Examiner*—Robert F. White
*Assistant Examiner*—James B. Lowe
*Attorney, Agent, or Firm*—Thomas J. Morgan; Linn I. Grim; Marvin Bressler

[57] ABSTRACT

A biaxially oriented polyethylene terephthalate film having balanced shrinkage of at least 40 percent in both longitudinal and transverse directions and the process for forming the film. The biaxially oriented polyethylene terephthalate film is formed in a process where a cast sheet of polyethylene terephthalate is stretched in a first and a second direction, the second direction being perpendicular to the first direction. The ratio of the degree of stretching in the first and second directions is in the range of between about 0.8 and 1.2. The biaxially stretched film is thereafter heat set at a temperature in the range of between about 40° and 80°C.

3 Claims, No Drawings

PROCESS OF FORMING HEAT SHRINKABLE POLYETHYLENE TEREPHALATE FILM

BACKGROUND OF THE INVENTION

1. Field of the Invention

The instant invention is directed to a biaxially oriented polyethylene terephthalate film having balanced shrinkage properties and the process for forming said film. More specifically, the instant invention is directed to a biaxially oriented polyethylene terephthalate film having balanced shrinkage properties and a process in which polyethylene terephthalate cast sheet is biaxially oriented by stretching in two mutually perpendicular directions, the degree of stretch in each of these directions being substantially the same.

2. Description of the Prior Art

The outstanding properties associated with biaxially oriented polyethylene terephthalate film is testified to by the great number of applications to which this film has been put. One potentially significant application for polyethylene terephthalate film, however, has not been fully exploited due to the previously unavailable physical properties required of heat shrinkable film. That is, no polyethylene terephthalate film has previously been available which combines high shrinkage with balanced shrinkage properties. By balanced shrinkage properties one refers to the decrease in dimension in two perpendicular directions.

This failure, in the prior art, to produce a balanced heat shrinkable polyethylene terephthalate film has prevented this polyester film from being employed in several important markets. For instance, heat shrinkable polyethylene terephthalate film has potential application in the food packaging field. Not only is polyethylene terephthalate film clear, but, in addition, has excellent strength properties and high heat resistance. Thus, a polyethylene terephthalate film having balanced heat shrinkable properties could be employed not only in applications where polyethylene terephthalate film is employed to wrap foodstuffs, but, in addition, may be employed in applications where the wrapped foodstuff, for instance, poultry, may be taken from the freezer and heated in an oven without any additional preparation.

Other applications of polyethylene terephthalate heat skrinkable film include its use as a shrink package. Shrink packages are commonly employed to merchandise various products such as hardware items and the like.

In these applications, as well as many others not here recited, it is imperative that the film shrink sufficiently tightly around the product so as to better protect the product from the elements as well as to minimize the volume that the package or food product occupies.

A second important requirement of heat shrinkable films is the ability to have printed material on the film. As those skilled in the art are aware, print may be put on polyethylene terephthalate film. However, when the film is heat shrunk, the printing is distorted unless the film shrinks equally in two perpendicular directions. Thus, it is apparent that the failure of the prior art to provide a highly shrinkable balanced polyethylene terephthalate film has decreased the potential use of this film in these markets.

The limitations of the prior art have been recognized in U.S. Pat. No. 2,928,132. This patent is directed to a process for forming a heat shrinkable polyethylene terephthalate film. Although this reference appreciates the need for balanced shrinkage properties, and represents a distinct advance in the art, it is limited by the degree of shrinkage obtainable.

The above recited reference also teaches a process for forming a heat shrinkable polyethylene terephthalate film. Although the teachings of this reference again represent an advance in the art in terms of processing of polyethylene terephthalate film it presents certain processability disadvantages. For one thing, it requires that the ratio of stretching in the first direction to the second direction, the second direction being perpendicular to the first direction, be in the range of between 0.65 to 0.75. By restricting the process to this ratio the chances for processing upset due to switching of the first stretching direction is enhanced. Moreover, the tensile strength in each direction is generally proportional to the degree of stretching in each direction. Thus, unequal stretching in two perpendicular directions results in unequal tensile strength in the film formed therefrom. It is generally advantageous to have equal tensile strength in two perpendicular directions in polyethylene terephthalate film.

A further disadvantage of employing a degree of stretch in a first direction significantly lower than the degree of stretch in the second direction resides in the limitation on the rate of film production.

The process of the reference, furthermore, includes a heat setting procedure step which occurs at a relatively high temperature. A lower heat set temperature represents a process improvement in terms of cost, safety and simplicity of operation.

SUMMARY OF THE INVENTION

The instant invention is directed to a heat shrinkable film which provides balanced shrinkage properties to a degree not previously attained in any prior art heat shrinkable polyethylene terephthalate film. Moreover, the process employed to produce the unique shrinkable film of the instant invention results in a more flexible process which permits greater reliability in the event that the first stretching step is reversed. The process also results in the formation of a film having more uniform tensile properties. In addition, the process of the invention results in a greater rate of film production which is optimized when the degree of stretch in mutual perpendicular directions is approximately the same. Finally, the process of the instant invention has a lower energy requirement in that the heat setting step of the instant invention occurs at lower temperatures than those of the prior art processes.

In accordance with the instant invention, a biaxially oriented polyethylene terephthalate film is provided which is characterized by balanced shrinkage properties of at least 40 percent in both longitudinal and transverse directions. The process for forming this film includes the step of stretching a cast sheet of polyethylene terephthalate in a first direction followed by stretching the cast sheet in a second direction perpendicular to the first direction. The ratio of the degree of stretching in the first direction to the degree of stretching in the second direction is in the range of between 0.8 and 1.2. The biaxially oriented film produced thereby is thereafter heat set at a temperature in the range of between about 40° and 80°C.

DETAILED DESCRIPTION

The improved film of the instant invention is formed from a polymer produced by polymerization of bis (2-hydroxy ethyl) terephthalate. Bis (2-hydroxy ethyl) terephthalate is itself formed as an intermediate by one of two different methods. One method for producing bis (2-hydroxy ethyl) terephthalate is direct esterification of terephthalic acid and ethylene glycol as described in U.S. Pat No. 3,050,533. In this method the by-product of the reaction is water which is distilled from the reaction product. The other method for producing bis (2-hydroxy ethyl) terephthalate, is the transesterification reaction of a dialkyl ester of terephthalic (especially dimethyl terephthalate) with at least two molecular proportions of ethylene glycol per molecular proportion of dialkyl terephthalate. It is preferred to use higher proportions of ethylene glycol, i.e., in excess of two molecular proportions per molecular proportion of the dialkyl terephthalate since under these conditions the initial transesterification is caused to take place more rapidly and completely. The transesterification reaction is conducted under conditions of elevated temperatures (from about the boiling temperature of the reaction mixture to as high as 250°C.) and at atmospheric, subatmospheric or superatmospheric pressures. The by-product of the transesterification reaction is an alkanol, for example, if dimethyl terephthalate is used, methanol is removed from the reaction product. Many know catalysts can be used to speed the transesterification reaction.

After the bis (2-hydroxy ethyl) terephthalate has been produced, it is converted to polyethylene terephthalate polymer by heating to a temperature above the boiling point of ethylene glycol, or the reaction mixture, under conditions effecting removal of the glycol or water and to temperatures as high as 325°C., if desired. It is essential in obtaining the desired polymerized product that during the heating, or during a portion of the heating period, the pressure be reduced so as to provide rapid distillation of the excess glycol or water. The pressure may be reduced in successive stages so that the heating begins at normal pressure, is continued at a reduced pressure and is completed at a further reduced pressure. Final pressures in the range of from about 1 to 10 millimeters Hg are preferred. The materials used as catalysts in the esterification reaction may also be present as catalysts in the polymerization reaction. The preferred polymerization catalysts are antimony compounds such as antimony trioxide, antimonic acid and the like to accelerate conversion of the bis (2-hydroxy ethyl) terephthalate to polyethylene terephthalate polymer having an intrinsic viscosity, as measured in orthochlorophenol, in excess of 0.3 deciliter per gram, and preferably ranging from about 0.4 to about 1.0 deciliter per gram. Still more preferably, the polyethylene terephthalate polymer of the instant invention has an intrinsic viscosity of about 0.62 to 0.9 deciliter per gram.

The heating of the polymerization reaction is conducted under conditions to prevent oxidation, i.e., any presence of oxygen should be avoided, and a slow stream of an inert gas, for example, nitrogen, carbon dioxide and the like can be passed through or over the molten mass. During the heating and polymerization, viscosity of the melt gradually increases; the temperature must be maintained high enough to keep the mass in the molten state during the entire heating period. The heating is continued at least until a film can be formed from the melt which possesses the desired properties and the melting point of the polymerized product exceeds about 240°C., preferably exceeding 250°C. After heating is completed the product may be utilized to produce films or otherwise removed from the reaction vessel in molten form and formed into blocks, chips, and the like for further use.

The molten polyethylene terephthalate is extruded through a die onto a cooled casting roll to form a cast sheet of polyethylene terephthalate. The relatively amorphous cast sheet is thereafter biaxially oriented by stretching the sheet in a first direction followed by stretching in a second direction perpendicular to the first direction. The directions of stretching are the longitudinal and transverse directions. Either the longitudinal or transverse direction may be the first direction for stretching. A cast sheet is stretched between about 2.5 to 3.5 times the original length in both first and second directions. Thus, the draw ratio in each direction is in the range of between about 2.5:1 and 3.5:1. Of significance is the ratio of the degree of stretching in the first direction to the degree of stretching in the second direction. In a preferred embodiment this ratio is in the range of between about 0.8 and 1.2. More preferably, the ratio of the degree of stretching in the first direction to the degree of stretching in the second direction is in the range of between about 0.9 and 1.1. In a preferred embodiment the direction of first stretching is the longitudinal direction. In this embodiment the direction of second stretching is, of course, the transverse direction.

The preferred temperature range for stretching in the first direction is in the range of between about 65° and 75°C. The preferred temperature range for stretching in the second direction is in the range of between about 70° and 85°C. Upon completion of stretching, a biaxially oriented film is produced. The biaxially oriented film is thereafter heat set. The heat setting step comprises exposing the biaxially oriented film to an elevated temperature under tension. In the process of this invention the heat setting step comprises exposing the film to a temperature in the range of between about 40° and 80°C.

The biaxially oriented polyethylene terephthalate film produced in accordance with the above described process is characterized by possessing balanced shrinkage properties. Film shrinkage is defined by the degree to which a film decreases in linear dimension in one direction following exposure to an elevated temperature for a fixed period of time. Most commonly, the test for film shrinkage is immersion in hot water, i.e., 90°C. for 5 seconds. By balanced shrinkage one denotes a film having approximately the same percent shrinkage in two perpendicular directions. Conventionally, this means that the percent shrinkage in the longitudinal direction is approximately the same as the percent shrinkage in the transverse direction.

The polyethylene terephthalate film of this invention is further characterized by not only possessing balanced shrinkage properties but having a balanced shrinkage of at least 40 percent in both longitudinal and transverse directions.

The following examples are given to illustrate the instant invention. Since the examples are meant for illustrative purposes only, nothing contained in these examples should be interpreted as limiting the scope and spirit of the invention.

EXAMPLE I

A polyethylene terephthalate melt formed in accordance with the above described procedure was extruded through a die onto a cooled casting roll. A polyethylene terephthalate cast sheet was formed thereby. The polyethylene terephthalate cast sheet was initially stretched in the longitudinal direction. The longitudinally stretched film was thereafter stretched in the transverse direction to produce a biaxially oriented polyethylene terephthalate film. This film was then heat set under tension.

Eight separate runs were made. Each run resulted in the formation of several master rolls of polyethylene terephthalate film. Samples from each master roll were tested to determine the shrinkage properties of the film. The test comprised carefully measuring the longitudinal and transverse lengths of a sample of film. The film was then immersed in hot water (90°C.) for 5 seconds. The film was dried and measured again to determine its linear dimensions. The percent shrinkage in each linear dimension is recorded as the decrease in dimension in that direction divided by the original dimension in the same direction.

Table I, which appears below, summarizes each example. The observed processing conditions are given, that is, the draw ratio in the longitudinal and transverse directions, the temperature during the stretching in these directions, and the heat setting temperature. In addition, one important calculated result is recorded. That is, the ratio of stretching in the first (longitudinal) to the second stretching direction (transverse) is recorded. Besides the recording of processing data, the Table includes the observed average shrinkage, in percent, in both longitudinal and transverse directions.

ratio of the degree of stretching in the longitudinal direction to the degree of stretching in the transverse direction — is within 20 percent of unity, that is, between 0.8 and 1.2. In the prior art the ratio of the degree of stretching in the first to the second directions is recited to be between 0.65 and 0.75. As those skilled in the art are aware the process of this invention results in a higher production of the film per unit time.

TABLE II

| Master Roll No. | % Longitudinal Direction Shrinkage | % Transverse Direction Shrinkage |
| --- | --- | --- |
| 1 | 41 | 41 |
| 2 | 40 | 40 |
| 3 | 52 | 51 |
| 4 | 50 | 50 |
| 5 | 54 | 53 |
| 6 | 61 | 59 |
| 7 | 47 | 47 |
| 8 | 53 | 53 |
| 9 | 53 | 53 |
| Average: | 51.6 | 51.9 |

Another significant difference relates to the heat setting temperature. In the prior art the heat setting temperature is not below 85°C. As indicated in the data the heat setting temperature of the process of this invention is always significantly below this temperature. The lower the heat set temperature the more efficient is the process in that the energy requirements are minimized.

Of equal significance is the results relating to the film produced by this invention. Unlike the polyethylene terephthalate heat set shrinkable films of the prior art, not only is the heat shrink properties of the film balanced but the degree of balance shrinkage is higher that the films of the prior art. In the prior art no film shrinks to as high a degree as in the instant invention.

TABLE I

| Ex. | Longitudinal Direction Draw Ratio | Transverse Direction Draw Ratio | Ratio of Degree of Stretch in 1st. Direction to 2nd. Direction | Longitudinal Direction Draw Temp. °C. | Transverse Direction Draw Temp. °C. | Heat Set Temp. °C. | % Shrinkage in Longitudinal Direction | % Shrinkage in Transverse Direction | Ratio of Shrinkage in Long.- to Trans. Direction |
| --- | --- | --- | --- | --- | --- | --- | --- | --- | --- |
| I | 2.7 | 3.0 | .9 | 70 | 80 | 72 | 52 | 52 | 1.0 |
| II | 2.5 | 2.5 | 1.0 | 65 | 75 | 40 | 59 | 63 | .94 |
| III | 3.0 | 3.0 | 1.0 | 65 | 82 | 65 | 59 | 62 | .95 |
| IV | 3.0 | 3.0 | 1.0 | 72 | 75 | 65 | 63 | 63 | 1.0 |
| V | 3.0 | 3.0 | 1.0 | 72 | 82 | 65 | 59 | 63 | .94 |
| VI | 3.0 | 2.5 | 1.2 | 72 | 82 | 65 | 58 | 61 | .95 |
| VII | 3.5 | 3.5 | 1.0 | 65 | 75 | 40 | 64 | 64 | 1.0 |
| VIII | 3.5 | 2.5 | 1.2 | 65 | 75 | 40 | 65 | 60 | 1.08 |

As indicated above, the percent shrinkage represents an average value based on several samples from different master rolls produced in each run. Table II illustrates this by summarizing the percent shrinkage in both longitudinal and transverse directions for samples taken from the nine master rolls produced in accordance with the conditions summarized for Example I. As indicated on the bottom of Table II the average shrinkage in longitudinal and transverse directions is the value recorded for percent shrinkage in Table I.

Significant results that are obtained by a careful review of this data indicate that the process of this invention provides significant improvements over the processes of the prior art. The ratio of the degree of stretching in the first direction to the degree of stretching in the second direction — in these examples the A review of the data for the films produced in accordance with the process of this invention indicate that all shrinkage data is far in excess of 40 percent. As those skilled in the art are aware the greater the shrinkage the more useful is the film as a heat shrinkable film. Users of heat shrinkable film heat the film over the material to be wrapped. For an equivalent type wrap the temperature required is inversely proportional to the degree of shrinkage of the film. Thus, higher energy requirements are required for wrapping of the heat shrinkable films of the prior art. Alternately, an equivalent temperature requires less residence time for a film having higher shrinkability properties. Thus, a film having higher shrinkage characteristics results in a more useful film.

The above preferred embodiments and examples illustrate the scope and spirit of the invention. These embodiments and examples will make apparent, to those skilled in the art, other embodiments and examples within the scope and spirit of the instant invention. Thus, the invention should be limited only by the appended claims which follow.

What is claimed is:

1. A process for forming a biaxially oriented, heat shrinkable film having balanced properties which comprises stretching a cast sheet of polyethylene terephthalate in a first direction, said cast sheet stretched at a draw ratio in the range of between about 2.5:1 and 3.5:1 and at a temperature in the range of between about 65° and 75°C., to form a uniaxially drawn sheet, thereafter stretching said uniaxially drawn sheet in a second direction, perpendicular to the first direction, said uniaxially drawn sheet stretched at a draw ratio in the range of between about 2.5:1 and 3.5:1 and at a temperature in the range of between about 70° and 85°C., to form a polyethylene terephthalate film, the ratio of the degree of stretching in said first direction to the degree in said second direction being in the range of between about 0.8 and 1.2, said film thereafter heat set at a temperature in the range of between about 40° and 80°C.

2. A process in accordance with claim 1 wherein said ratio of the degree stretching in said first direction to the degree of stretching in said second direction is in the range of between about 0.9 and 1.1.

3. A process in accordance with claim 1 wherein said first direction is the longitudinal direction and said second direction is the transverse direction.

* * * * *